(12) United States Patent
Hammar et al.

(10) Patent No.: US 7,666,947 B2
(45) Date of Patent: Feb. 23, 2010

(54) GASKET MATERIAL

(75) Inventors: Jarod R. Hammar, Fairport, NY (US); Erik Phelps, Fairport, NY (US); Stefan Pitolaj, Walworth, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 929 days.

(21) Appl. No.: 11/100,776

(22) Filed: Apr. 7, 2005

(65) Prior Publication Data

US 2005/0250909 A1 Nov. 10, 2005

Related U.S. Application Data

(60) Provisional application No. 60/560,068, filed on Apr. 7, 2004.

(51) Int. Cl.
- *C08L 27/12* (2006.01)
- *C08L 27/18* (2006.01)
- *C08F 214/26* (2006.01)
- *C08J 9/00* (2006.01)

(52) U.S. Cl. .............. 525/191; 525/199; 525/200; 524/520

(58) Field of Classification Search ........ 525/191, 525/199, 200; 524/520
See application file for complete search history.

(56) References Cited

U.S. PATENT DOCUMENTS

| | | | |
|---|---|---|---|
| 4,096,227 A | 6/1978 | Gore | |
| 4,839,221 A | 6/1989 | Asaumi et al. | |
| 4,913,951 A | 4/1990 | Pitolaj | |
| 4,985,296 A | 1/1991 | Mortimer, Jr. | |
| 4,990,296 A | 2/1991 | Pitolaj | |
| 5,215,337 A | 6/1993 | Spirkowye et al. | |
| 5,224,394 A | 7/1993 | Kalinoski | |
| 5,486,010 A | 1/1996 | Hamilton et al. | |
| 5,492,336 A | 2/1996 | Barna et al. | |
| 5,494,301 A | 2/1996 | Hamilton et al. | |
| 5,551,706 A | 9/1996 | Barna et al. | |
| 5,581,019 A | 12/1996 | Minor et al. | |
| 5,828,012 A | 10/1998 | Repolle et al. | |
| 5,879,789 A | 3/1999 | Dolan et al. | |
| 6,030,694 A | 2/2000 | Dolan et al. | |
| 6,089,576 A | 7/2000 | Hollenbaugh, Jr. et al. | |
| 6,127,059 A | 10/2000 | Kato | |
| 8,127,488 | 10/2000 | Burger et al. | |
| 6,199,979 B1 | 3/2001 | Hobson et al. | |
| 6,331,351 B1 | 12/2001 | Waters et al. | |
| 6,485,809 B1 | 11/2002 | Minor et al. | |
| 6,512,834 B1 | 1/2003 | Banter et al. | |
| 6,596,369 B2 | 7/2003 | Ottinger et al. | |
| 6,706,819 B1 * | 3/2004 | Araki et al. | 525/199 |

FOREIGN PATENT DOCUMENTS

| | | |
|---|---|---|
| EP | 0352608 B1 | 1/1995 |
| EP | 0 613 921 B1 | 11/1999 |

OTHER PUBLICATIONS

International Bureau "Notification Concerning Transmittal of International Preliminary Report on Patentability (Chapter 1 of the Patent Cooperation Treaty" Mar. 5, 2009.

* cited by examiner

*Primary Examiner*—Nathan M Nutter
(74) *Attorney, Agent, or Firm*—Holland & Hart LLP

(57) ABSTRACT

A gasket material comprising polytetrafluoroethylene (PTFE) and a thermoplastic polymer having a melting point lower than the melting point of PTFE. Preferred thermoplastic polymers comprise fluorinated thermoplastic polymers, and most preferred fluorinated thermoplastic polymers comprise fluorinated ethylene propylene and perfluoroalkoxy copolymer. The PTFE component preferably comprises full density PTFE, and a filler material may optionally be added. The PTFE component is present in the gasket material in an amount from approximately 50% to less than 100%, based on the total weight of the gasket material, and the thermoplastic polymer is present in an amount from greater than 0% to approximately 20%, based on the total weight of the gasket material.

16 Claims, No Drawings

GASKET MATERIAL

CROSS REFERENCE TO RELATED APPLICATIONS

The present application claims priority under 35 U.S.C. § 119(e) from U.S. Provisional Patent application Ser. No. 60/560,068 filed Apr. 7, 2004, entitled "Gasketing Material for Monomer Applications", the disclosure of which is incorporated herein by reference.

FIELD OF THE INVENTION

The present invention relates generally to gasket materials and specifically to a non-reactive gasket material particularly well suited for use in monomer applications.

BACKGROUND OF THE INVENTION

Monomer applications including, for example, vinyl chloride and styrene monomer processing, require specialized handling to prevent the highly reactive monomer from reacting with the surrounding environment, including pipes, valves, gaskets and the like.

A preferred gasket material for a variety of gasketing applications is polytetrafluoroethylene (PTFE) due to its high corrosion resistance. PTFE gasket material is often reinforced by blending the PTFE with a filler or providing a backing sheet of metallic mesh or foil to add the desired strength characteristics and reduce the creep and cold flow problems associated with PTFE.

However, gaskets made from PTFE-based materials have been shown to fail in monomer applications. Notwithstanding the high corrosion resistance of PTFE, the monomer reacts with the gasket material and causes premature failure of the seal. Failure of PTFE gasket material used in monomer applications is thought to be caused by "pop-corning." "Pop-corning" occurs when individual monomer units seep into micro-voids in the PTFE structure and polymerize. The individual monomer units are smaller than the micro-voids, thus they can pass around and through the PTFE structure and into these spaces. When a plurality of monomer units migrate into a micro-void, they may polymerize. The polymerized structure often is larger than the sum of the individual monomer units due to the highly organized polymerization. This increase in size of the newly formed polymer within the PTFE micro-void exerts force on the interior walls of the micro-void and pushes outward as additional monomers enter, polymerize, and the new polymer expands within the micro-void. This expansion eventually leads to a rupture of the micro-void and a stretching, tearing, or ripping of the surrounding PTFE structure. As this continues throughout the PTFE structure, the gasket material weakens and is more susceptible to failure.

There are several different types of PTFE gasket materials, including modified PTFE, unfilled PTFE, filled PTFE, and coated PTFE systems. When used in monomer applications, all of these PTFE gasket materials are known to exhibit the "pop-corning" effect discussed above.

To overcome the "pop-corning" seen in PTFE based gaskets, a fluorinated ethylene propylene (FEP) or perfluoroalkoxy copolymer (PFA) gasket material is often recommended. These materials do not exhibit the micro-voids seen in the PTFE and, therefore, do not allow monomer to penetrate the surface of the gasket and polymerize. However, fluorinated thermoplastic polymer gasket materials, such as PFA and FEP, do not provide the structural rigidity seen with PTFE gaskets and are likewise susceptible to cold flow/creep. Additionally, these materials are more costly to purchase, more difficult to incorporate with fillers, and require more expensive processing means and machinery.

It is, therefore, desirable to provide a gasket material comprising the rigidity, ease of processing, and relative economy of PTFE with the enhanced resistance to monomers and other highly reactive compounds. It is to these perceived needs that the present invention is directed.

SUMMARY OF THE INVENTION

In a first aspect of the present invention a gasket material is provided comprising polytetrafluoroethylene (PTFE) and a thermoplastic polymer having a melting point lower than the melting point of PTFE. In one embodiment of the present invention, the thermoplastic polymer comprises a fluorinated thermoplastic polymer. In a preferred embodiment of the present invention, the fluorinated thermoplastic polymer comprises fluorinated ethylene propylene. In another preferred embodiment of the present invention, the fluorinated thermoplastic polymer comprises perfluoroalkoxy copolymer. In a most preferred embodiment of the present invention, the PTFE comprises full density PTFE. In an additional embodiment of the present invention, the gasket material further comprises filler material.

In a further embodiment of the present invention, PTFE is present in the gasket material in an amount from approximately 50% to less than 100%, based on the total weight of the gasket material. In another embodiment of the present invention, the thermoplastic polymer is present in an amount from greater than 0% to approximately 20%, based on the total weight of the gasket material. In a preferred embodiment of the present invention, the thermoplastic polymer is present in an amount from at least 5% to approximately 15%, based on the total weight of the gasket material.

In a second aspect of the present invention, a gasket material is provided consisting essentially of polytetrafluoroethylene (PTFE) and at least one thermoplastic polymer having a melting point lower than the melting point of PTFE. In one embodiment of the present invention, the gasket material comprises a mixture of two or more thermoplastic polymers. In an additional embodiment of the present invention, the gasket material further comprises a filler material. In a preferred embodiment of the present invention, the thermoplastic polymer comprises a fluorinated thermoplastic polymer. In one most preferred embodiment of the present invention, the fluorinated thermoplastic polymer comprises fluorinated ethylene propylene. In another most preferred embodiment of the present invention, the fluorinated thermoplastic polymer comprises perfluoroalkoxy copolymer.

In an additional embodiment of the present invention, the thermoplastic polymer is present in an amount from greater than 5% to approximately 20%, based on the total weight of the gasket material.

In a further aspect of the present invention, a method for manufacturing a gasket material is provided comprising mixing polytetrafluoroethylene (PTFE) and a fluorinated thermoplastic polymer with a melting point lower than that of PTFE together with a solvent to form a slurry, charging the slurry into a vacuum apparatus, applying a vacuum to the slurry and removing a majority of the solvent, charging the remaining slurry to a frame and pressing the slurry to form a cake, calendaring the cake to form a sheet, drying the mixture by raising the temperature to remove any remaining solvent, heating the sheet above the melting point of both the PTFE and thermoplastic polymer components, and cooling the sheet in a controlled manner, wherein the thermoplastic polymer flows into and fills any voids in the PTFE structure resulting in a low porosity finished gasket material.

In a further embodiment of the present invention, the steps of heating the sheet above the melting point of the components and cooling the sheet in a controlled manner, further comprise performing the heating and cooling steps under an applied pressure. In a still further embodiment of the present invention, the cooling step is performed at a pressure which is less than the pressure of the heating step. In an alternate embodiment of the present invention, the cooling step is performed under no applied pressure.

A feature and advantage of the present invention is a PTFE-based gasket material for monomer and other highly reactive applications that is not susceptible to the pop-corning effect typically observed in PTFE-based gaskets.

A further advantage of the present invention is increased weldability of the gasket material due to the presence of fluorinated thermoplastic polymers in the PTFE gasket material.

As will be realized by those of skill in the art, many different embodiments of a gasket material according to the present invention are possible. Additional uses, objects, advantages, and novel features of the invention are set forth in the detailed description that follows and will become more apparent to those skilled in the art upon examination of the following or by practice of the invention.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

So that the manner in which the above-recited features, advantages and objects of the invention, as well as others which will become more apparent, are obtained and can be understood in detail, a more particular description of the invention briefly summarized above may be had by reference to the embodiment thereof which is illustrated in the appended drawings, which drawings form a part of the specification and wherein like characters of reference designate like parts throughout the several views. It is to be noted, however, that the appended drawings illustrate only preferred and alternative embodiments of the invention and are, therefore, not to be considered limiting of its scope, as the invention may admit to additional equally effective embodiments.

DETAILED DESCRIPTION

The present invention provides a gasket material particularly well suited for monomer applications, comprising a blend of PTFE and a fluorinated thermoplastic polymer, which is not susceptible to micro-absorption of the monomer and pop-corning of the gasket material. While one objective of the present invention is to provide a gasket material for use in monomer applications, it will be recognized that the gasket material has other applications in highly reactive environments.

In a preferred embodiment of the present invention, the PTFE component comprises full density PTFE homopolymer so as to minimize the normal micro-voids therein. In another embodiment of the present invention, the PTFE component comprises an alternate PTFE material such as modified full density PTFE copolymers, other such known variations of PTFE.

The fluorinated thermoplastic polymer is preferably a polymer with a low reactivity and a melting point lower than that of the PTFE component. In a further embodiment of the invention, a combination of fluorinated thermoplastic polymers is employed with the PTFE. Combinations of fluorinated thermoplastic polymers may be employed to impart additional desirable characteristics to the finished material.

In a preferred embodiment of the present invention, the fluorinated thermoplastic polymer component is chosen from the group consisting of FEP (fluorinated ethylene propylene) and PFA (perfluoroalkoxy copolymer). The most preferred fluorinated thermoplastic polymer for use in the present invention is PFA. In addition to the preferred FEP and PFA, other melt processable fluorinated thermoplastic polymers or combinations of melt processable fluorinated thermoplastic polymers may be employed in conjunction with the present invention.

Though not preferred it is within the scope of the present invention to employ non-fluorinated thermoplastic polymers. Fluorinated thermoplastic polymers are preferred because after they flow into the void space within the PTFE structure, and the fluorinated thermoplastic polymer will bond with nearby PTFE. Other melt processable polymers may flow into and fill the voids in the PTFE structure, but they generally will not bond with the PTFE. For this reason, additional thermoplastic polymers suitable for use with the present invention include those that are compatible with the PTFE and have serviceable temperatures within the processing range of the present invention.

The relative amounts of PTFE and the thermoplastic polymer component will vary depending on the particular application for which the gasket material is produced. In one embodiment of the present invention, the PTFE component comprises from about 50% by weight to less than 100% by weight based on the final weight of the gasket material. In a preferred embodiment of the present invention, the PTFE component comprises from about 70% to less than 100% by weight. In a preferred embodiment of the present invention, the thermoplastic polymer component is present from greater than 5% to about 20%. In a most preferred embodiment of the present invention, the thermoplastic polymer component comprises from about 10% to about 15% based on the total weight of the finished gasket material.

Typically PTFE and fluorinated thermoplastic polymers by themselves are not very good gasket materials, as they both exhibit a high cold flow or creep. With the incorporation of other fillers, as is known in the art, the creep resistance of the gasket material is greatly improved. In an embodiment of the present invention, the PTFE may be filled with various particulate fillers presently used to fill PTFE. Particulate fillers may be an inorganic material selected from the class consisting of metals, semi-metals, metal oxides, glass, mica, silica, titanium dioxide, barium titanate, potassium titanate, and the like. Particulate fillers may also be an organic material selected from the class consisting of activated carbon, carbon black, pigments of various kinds and polymeric resin.

In a second aspect of the present invention, the gasket material is produced by combining granular and/or fine powder PTFE with a powdered fluorinated thermoplastic polymer and processing the combination using a process as is known in the art to make a sheet of gasket material.

In an exemplary embodiment of such a process, dry PTFE and PFA powders are weighed and added to a solvent, such as petroleum naphtha, to form a slurry. The slurry is mixed and poured into vacuum apparatus to remove the majority of the solvent. The remaining PTFE/PFA/solvent mixture is then added to a frame, and pressed under high pressure to form a cake. The cake is then calendered and the resultant sheet is dried in an oven to remove any excess solvent. The sheet is then heated above the melting point of both the PTFE and PFA components, and subsequently cooled in a controlled manner.

It is currently understood that the advantage of this process and product is that pure PTFE solidifies at approximately 621° F. while the PFA solidifies at approximately 582° F. After the sintering step, the PTFE/PFA sheet is cooled. Since the solidification point of the PTFE is higher than the solidification point of the PFA, the PFA will remain liquid and flow into the micro-voids created in the PTFE structure as it cools. The PFA fills and seals the micro-voids. By eliminating the micro-voids in the finished product, the pop-corning effect and subsequent failure of the PTFE gasket in monomer applications is eliminated.

In a preferred embodiment, the materials are combined and formed into a sheet of gasket material that can then be die cut into the desired shape for a specific application. In an alternate embodiment of the present invention, the material combination is employed in a molding or extrusion process to create a discreet gasket rather than a sheet format. In a further alternate embodiment of the present invention, the gasket material is formed in a billet and skive process wherein the gasket material is formed into a cylindrical billet, then passed through a lathe to shave off sheets of material at the desired thickness. One skilled in the art will recognize the various means of utilizing the gasket material of the present invention to provide a non-reactive barrier for monomer applications.

In a further embodiment of the present invention, an optional processing method wherein the gasket material is heated and cooled under pressure is available to further reduce the pore size and enhance the filling of voids in the material. Once the dried PTFE/PFA sheet is removed from the oven as described above, the sheet is placed in a press between heated plates. Sheets of aluminum foil are used adjacent to the PTFE/PFA sheet, and steel sheets are placed on the other side of the aluminum foil sheets to form a multi-layered sandwich. The steel sheets help to maintain smooth surfaces on the material, and the aluminum foil prevents the PTFE material from bonding to the steel sheets. A silicone based release spray or other suitable mold release may optionally be applied in place of aluminum foil to allow for releasing of the PTFE/PFA gasket material from the steel sheets.

In a further embodiment of the present invention, an optional processing method comprising pressurized heating and cooling may be applied to dry unsintered gasket sheets as well as to previously oven sintered sheets. For example, for sintered sheets, the entire sandwich is clamped to a portion of the press body or a supporting table, and the press is closed to apply pressure to hold the assembly in position while heat is applied to the degree and time necessary to melt the thermoplastic polymer into the voids of the PTFE. For example, the preferred initial pressure on some typical material compositions is on the order of 100 to 150 psi and the preferred press temperature is on the order of about 650° F. to 700° F., i.e. just above the melting point of the PTFE component. As the temperature of the sintered components increase, they expand and the pressure within the press increases, typically to a level on the order of 400 to 500 psi. With a typical ⅛ thick component and a preheated press, total time in the press to heat the components is on the order of about 3 minutes. Thinner components will heat more quickly, while thicker ones will require a longer press time.

Upon completion of the heating step, the resultant assembly is cooled. The cooling is preferably accomplished under pressure, however, this step may optionally be performed at atmospheric pressure. Preferably, the assembly is transferred quickly from the heated press to a cooling press which is then closed to apply and maintain a pressure during the cooling step that is less than the initial pressure during the heating step. Generally, a pressure on the order of about 5 to 30 psi will be sufficient. Both the heating and the cooling steps may be carried out in the same press if necessary or desired.

Processing the gasket material under pressure as described above will further decrease the porosity of the PTFE thereby requiring less thermoplastic polymer to fill the remaining voids. Further, the decreased porosity leads to improved sealability of the gasket material. The result is a better gasket material with improved densification which is more resistant to exposure to monomers.

One additional feature and advantage of the gasket material of the present invention is the enhanced weldability of the material due to the addition of a fluorinated thermoplastic polymer. As discussed in U.S. Pat. No. 4,990,296 to Pitolaj, herein incorporated by reference, joining filled and/or sintered PTFE components poses some difficulty. One approach to welding such components is to employ an intermediate layer of a fluorinated thermoplastic polymer, such as FEP, to strengthen the adhesion between the PTFE components. The advantage of the gasket material of the present invention lies in the presence of a fluorinated thermoplastic polymer already integrated into the PTFE structure. This allows pieces of the gasket material to be joined together without an additional intermediate adhesive layer. The particular welding process employed with the material of the present invention may comprise the processes described in the U.S. Pat. No. 4,990,296, or other known PTFE welding processes.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

What is claimed is:

1. A gasket material comprising:
    a polytetrafluoroethylene (PTFE) component having a plurality of micro-voids; and a thermoplastic polymer, having a melting point lower than a melting point of the PTFE component;

said thermoplastic polymer substantially filling the microvoids of said polytetrafluoroethylene to create a substantially non-porous gasket material.

2. The gasket material of claim 1, wherein the thermoplastic polymer comprises a fluorinated thermoplastic polymer.

3. The gasket material of claim 2, wherein the fluorinated thermoplastic polymer comprises fluorinated ethylene propylene.

4. The gasket material of claim 2, wherein the fluorinated thermoplastic polymer comprises perfluoroalkoxy copolymer.

5. The gasket material of claim 1, further comprising filler material.

6. The gasket material of claim 1, wherein the PTFE comprises full density PTFE.

7. The gasket material of claim 1, wherein the PTFE is present in the gasket material in an amount from approximately 50% to less than 100%, based on the total weight of the gasket material.

8. The gasket material of claim 1, wherein the thermoplastic polymer is present in an amount from greater than 0% to approximately 20%, based on the total weight of the gasket material.

9. The gasket material of claim 8, wherein the thermoplastic polymer is present in an amount from at least 5% to approximately 15%, based on the total weight of the gasket material.

10. A substantially non-porous gasket material consisting essentially of:

a microporous polytetrafluoroethylene (PTFE) material; and at least one thermoplastic polymer, having a melting point lower than a melting point of the microporous polytetrafluoroethylene material, said at least one thermoplastic polymer substantially filling the micropores of the microporous polytetrafluoroethylene material.

11. The gasket material of claim 10, comprising a mixture of two or more thermoplastic polymers.

12. The gasket material of claim 10, further comprising a filler material.

13. The gasket material of claim 10, wherein the thermoplastic polymer comprises a fluorinated thermoplastic polymer.

14. The gasket material of claim 13, wherein the fluorinated thermoplastic polymer comprises fluorinated ethylene propylene.

15. The gasket material of claim 13, wherein the fluorinated thermoplastic polymer comprises perfluoroalkoxy copolymer.

16. The gasket material of claim 10, wherein the thermoplastic polymer is present in an amount from greater than 5% to approximately 20%, based on the total weight of the gasket material.

* * * * *

UNITED STATES PATENT AND TRADEMARK OFFICE
CERTIFICATE OF CORRECTION

PATENT NO. : 7,666,947 B2
APPLICATION NO. : 11/100776
DATED : February 23, 2010
INVENTOR(S) : Hammar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Seventh Day of December, 2010

David J. Kappos
*Director of the United States Patent and Trademark Office*